US010001911B2

(12) United States Patent
Breedvelt-Schouten et al.

(10) Patent No.: US 10,001,911 B2
(45) Date of Patent: Jun. 19, 2018

(54) ESTABLISHING A COMMUNICATION LINK BETWEEN PLURAL PARTICIPANTS BASED ON PREFERENCES

(71) Applicant: International Business Machines Corporation, Armonk, NY (US)

(72) Inventors: Ilse M. Breedvelt-Schouten, Ontario (CA); Jana H. Jenkins, Raleigh, NC (US); Jeffrey A. Kusnitz, Campbell, CA (US); James L. Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 14/683,321

(22) Filed: Apr. 10, 2015

(65) Prior Publication Data

US 2016/0299670 A1    Oct. 13, 2016

(51) Int. Cl.
*G06F 3/0484* (2013.01)
*H04L 12/58* (2006.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC ...... G06F 3/04847; G07C 13/00; G06Q 30/02
(Continued)

(56) References Cited

U.S. PATENT DOCUMENTS 7,233,933 B2    6/2007  Horvitz et al.
9,201,952 B1 *  12/2015  Chau ................. G06F 17/30867
(Continued)

FOREIGN PATENT DOCUMENTS

EP    1505529 A1    2/2005
EP    2463786 A1    6/2012
(Continued)

OTHER PUBLICATIONS

Chan, Andrew, et al.; "Designing haptic icons to support collaborative turn-taking." International Journal of Human-Computer Studies 66, No. 5 (2008): 333-355.
(Continued)

*Primary Examiner* — Ranodhi Serrao
*Assistant Examiner* — James Fiorillo
(74) *Attorney, Agent, or Firm* — Nicholas Bowman; Edell, Shapiro & Finnan, LLC

(57) ABSTRACT

According to one embodiment of the present invention, a system determines the best communication channel to be utilized between multiple participants and establishes a communication link between the multiple participants via that communication channel. The system analyzes the preferences, limitations, behaviors, and capabilities of each of the participants and displays an aggregate of these traits from each of participants. The system then applies a set of rules and guidelines for determining which communication channel is best suited for establishing a communication link with all of the participants. The system comprises a computer system including at least one processor. Embodiments of the present invention further include a method and computer program product for determining the best communication channel to be utilized between multiple participants and establishing a communication link between the
(Continued)

multiple participants in substantially the same manner described above.

9 Claims, 12 Drawing Sheets

(51) Int. Cl.
    *H04L 29/06*     (2006.01)
    *G06F 3/0482*     (2013.01)
    *G06T 11/20*     (2006.01)
    *H04L 29/08*     (2006.01)
    *H04L 12/18*     (2006.01)
    *H04N 21/00*     (2011.01)
    *H04N 21/63*     (2011.01)

(52) U.S. Cl.
    CPC ........ *G06F 3/04845* (2013.01); *G06T 11/206* (2013.01); *H04L 12/18* (2013.01); *H04L 51/32* (2013.01); *H04L 65/403* (2013.01); *H04L 67/22* (2013.01); *H04N 21/00* (2013.01); *H04N 21/632* (2013.01); *G06T 2200/24* (2013.01)

(58) Field of Classification Search
    USPC ........................................ 709/206, 217, 227
    See application file for complete search history.

(56) References Cited

U.S. PATENT DOCUMENTS

| | | | |
|---|---|---|---|
| 9,378,467 B1* | 6/2016 | Chaiyochlarb | G06N 99/005 |
| 9,536,269 B2* | 1/2017 | Chang | G06Q 50/01 |
| 2002/0169658 A1 | 11/2002 | Adler | |
| 2003/0207242 A1* | 11/2003 | Balasubramanian | G09B 7/00 434/322 |
| 2004/0003042 A1 | 1/2004 | Horvitz et al. | |
| 2004/0221306 A1* | 11/2004 | Noh | H04N 5/44543 725/44 |
| 2006/0282856 A1* | 12/2006 | Errico | G06F 17/30035 725/46 |
| 2007/0033129 A1* | 2/2007 | Coates | G06Q 40/06 705/36 R |
| 2008/0059500 A1* | 3/2008 | Symens | G06F 17/30592 |
| 2008/0140448 A1* | 6/2008 | Hernandez | G06F 19/327 705/2 |
| 2008/0140776 A1 | 6/2008 | Horvitz | |
| 2011/0050702 A1* | 3/2011 | Heimendinger | G06T 11/206 345/440 |
| 2011/0066464 A1* | 3/2011 | George | G06Q 30/02 705/7.32 |
| 2011/0289161 A1* | 11/2011 | Rankin, Jr. | G06Q 10/107 709/206 |
| 2012/0005016 A1 | 1/2012 | Graff | |
| 2012/0072848 A1 | 3/2012 | Yonemoto | |
| 2013/0024342 A1 | 1/2013 | Horowitz et al. | |
| 2013/0060603 A1* | 3/2013 | Wagner | G06Q 30/0202 705/7.29 |
| 2013/0073336 A1 | 3/2013 | Heath | |
| 2013/0129075 A1 | 5/2013 | Whitaker | |
| 2013/0132589 A1* | 5/2013 | Erb | H04L 67/2823 709/227 |
| 2013/0191475 A1* | 7/2013 | Partovi | H04L 51/14 709/206 |
| 2013/0304691 A1 | 11/2013 | Pinckney et al. | |
| 2014/0120511 A1* | 5/2014 | Hall | G09B 5/14 434/350 |
| 2015/0015504 A1* | 1/2015 | Lee | G06F 3/04845 345/173 |
| 2015/0178877 A1* | 6/2015 | Bogomolov | G06F 3/04817 705/325 |
| 2015/0215256 A1* | 7/2015 | Ghafourifar | H04L 51/066 715/752 |
| 2015/0263962 A1* | 9/2015 | Cakmak | H04L 47/32 370/230 |
| 2016/0132231 A1* | 5/2016 | Rathod | H04N 5/23245 715/719 |
| 2016/0182311 A1* | 6/2016 | Borna | G06Q 10/1095 705/7.19 |
| 2016/0197993 A1* | 7/2016 | Perkowski | H04L 67/1097 709/203 |
| 2016/0255024 A1* | 9/2016 | Tichauer | H04L 51/24 709/206 |
| 2016/0269340 A1* | 9/2016 | Nano | H04L 67/10 |
| 2016/0269504 A1* | 9/2016 | Johar | H04L 67/306 |
| 2016/0275532 A1* | 9/2016 | Treiser | G06Q 30/02 |
| 2016/0300419 A1* | 10/2016 | Breedvelt-Schouten | G07C 13/00 |
| 2017/0150037 A1* | 5/2017 | Rathod | H04N 5/23216 |

FOREIGN PATENT DOCUMENTS

| | | |
|---|---|---|
| WO | 2008127737 A1 | 10/2008 |
| WO | 2012174632 A1 | 12/2012 |
| WO | 2014036511 A1 | 3/2014 |

OTHER PUBLICATIONS

Weber, Michael, et al.; "Visualization in e-Negotiations: An Inspire ENS Graph is Worth 334 Words, on Average." Electronic Markets 16, No. 3 (2006): 186-200.

Middleton et al., "Capturing Knowledge of User Preferences: Ontologies in Recommender Systems", K-CAP'01, Oct. 22-23, 2001, Victoria, British Columbia, Canada, Copyright 2001, pp. 100-107.

List of IBM Patents or Patent Applications Treated As Related, Apr. 10, 2015.

Anonymously; "Adding Social Network Group Members Based on an Activity"; An IP.com Prior Art Database Technical Disclosure; http://ip.com/IPCOM/000236536; May 1, 2014.

IBM; "Ad Hoc Mobile Social Networking for Professionals"; An IP.com Prior Art Database Technical Disclosure; http://ip.com/IPCOM/000159275; Oct. 16, 2007.

List of IBM Patents or Patent Applications Treated As Related, Apr. 13, 2016.

* cited by examiner

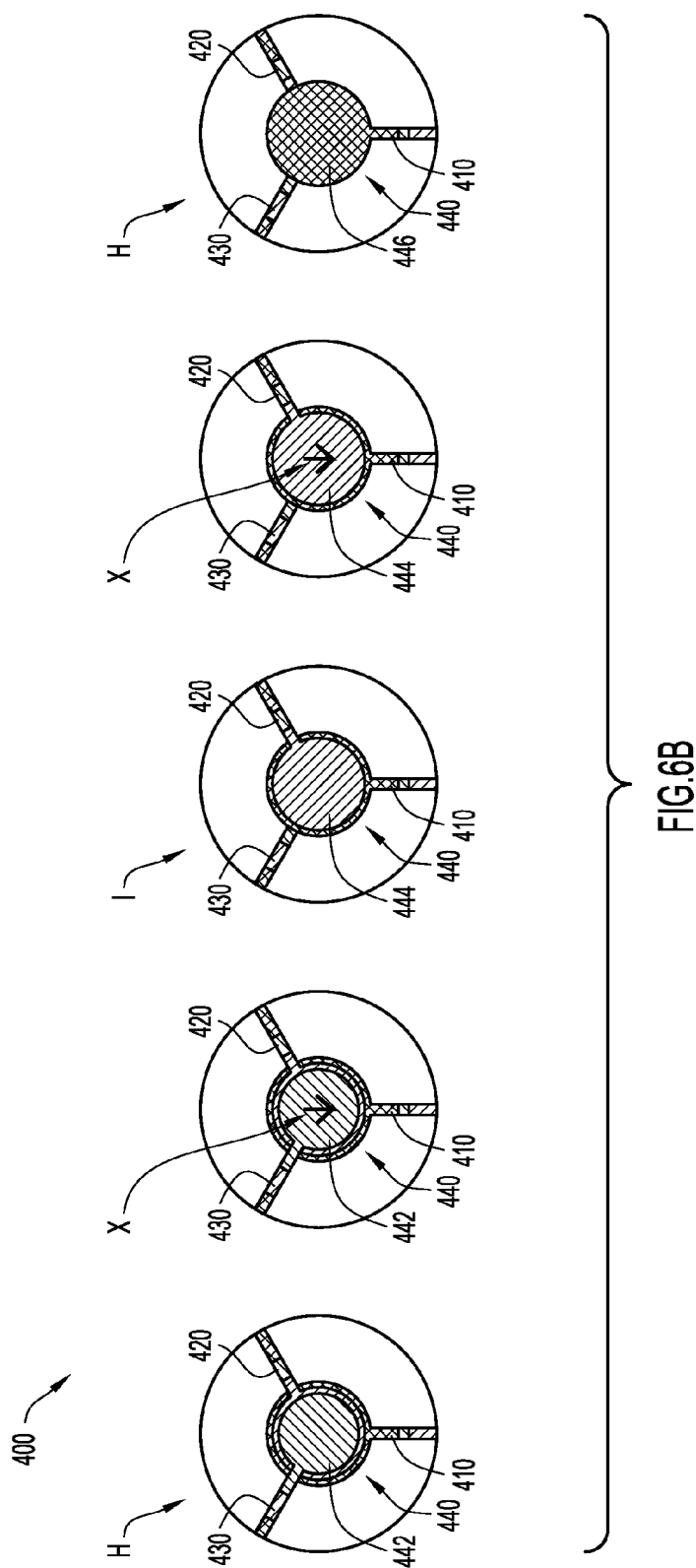

ESTABLISHING A COMMUNICATION LINK BETWEEN PLURAL PARTICIPANTS BASED ON PREFERENCES

BACKGROUND

Present invention embodiments relate to establishing communication links between plural participants, and more specifically, to selecting and utilizing the best communication channel for the multiple participants by analyzing the preferences, limitations, behaviors and capabilities of each of the participants.

Establishing communication links between multiple participants is established in multiple different ways. Groups of participants often communicate with one another via email, SMS/texting, tweeting, FACEBOOK posts, APPLE FACETIME, GOOGLE HANGOUTS, traditional audio calls, voicemail, etc. However, each participant often has their own preference, often is more familiar with one communication channel vs. another, or may not have the communication channel that many other participants prefer. Thus, choosing a communication channel to be used by multiple participants is often a negotiation between the participants.

There are known systems that utilize the social media network associated with a user to initiate contact with another user, where the system uses information about the users from the social media network. Other systems are able to switch between a first communication channel and a second communication channel during a communication session based on logic that determines the optimal communication channel based on channel characteristics for the type of communication that is being performed. However, neither of these systems provide a communication channel that is mostly favored by individual participants.

SUMMARY

According to one embodiment of the present invention, a system for conducting an activity among a plurality of participants includes a computer system that contains at least one processor. The at least one processor may be configured to monitor for each participant use of one or more options to conduct the activity and then generate a graphical display of the monitored use of each participant for each of the options for conducting the activity. The processor may also be configured to combine the monitored use of each participant for each of the options and determine the option to employ for the activity based on the combined monitored uses. Finally the processor may be configured to conduct the activity employing the determined option.

According to one embodiment of the present invention, a system determines the best communication channel to be utilized between multiple participants and establishes a communication link between the multiple participants via that communication channel. The system analyzes the preferences, limitations, behaviors, and capabilities of each of the participants and displays an aggregate of these traits from each of participants. The system then applies a set of rules and guidelines for determining which communication channel is best suited for establishing a communication link with all of the participants. The system comprises a computer system including at least one processor. Embodiments of the present invention further include a method and computer program for determining the best communication channel to be utilized between multiple participants and establishing a communication link between the multiple participants in substantially the same manner described above.

BRIEF DESCRIPTION OF THE SEVERAL VIEWS OF THE DRAWINGS

Generally, like reference numerals in the various figures are utilized to designate like components.

FIG. 6B illustrates the steps and methods for interacting with the graphical user interface of FIG. 6A.

DETAILED DESCRIPTION

The present invention embodiments pertain to identifying the behavioral tendencies and preferences of a plurality of users/participants for an activity, compiling the behavioral tendencies and/or preferences of the plurality of users/ participants, and then determining which of the options for completing the activity is best used for the activity based on the compiled behavioral tendencies and/or preferences from the plurality of users/participants.

For example, when a group of participants wish to communicate with one another digitally, one aspect of the embodiment of the present invention may identify the various communication channels that each of the participants is capable of using. The present invention embodiments may then compile the behavioral tendencies and/or preferences of the multiples participants for each of the communication channels. The behavioral tendencies/preferences may include which communication channels are available to each participant, the frequencies each of these channels have been used, the communication channel preference of each participant, the order that each participant ranks the communication channels in terms of familiarity, etc.

The present invention embodiments may then present a display of the compilation of tendencies/preferences of the communication channels to one or all of the participants to illustrate the comparison of the communication channels to each other. The display of the communication channels may be a graphical display that indicates the relative tendency/preference values of each the communication channels for each of the participants of the communication. The display may also be a control, where interaction with the display may establish a communication link via one of the communication channels. In one embodiment of the present invention, the display may be a bar graph, where each type of communication channel of each participant is represented by a bar that is proportional to the relative tendency or preference strength for that communication channel by the respective participant. The display may illustrate the tendency/preference intersections between the multiple participants, which channels are currently active and available for each of the participants, and any other properties that are tracked by the present invention. Once the display of the compilation of communication channels has been presented, one or all of the users can then determine which of the communication channels is best for performing the digital communication between all of the participants.

Figure 1:
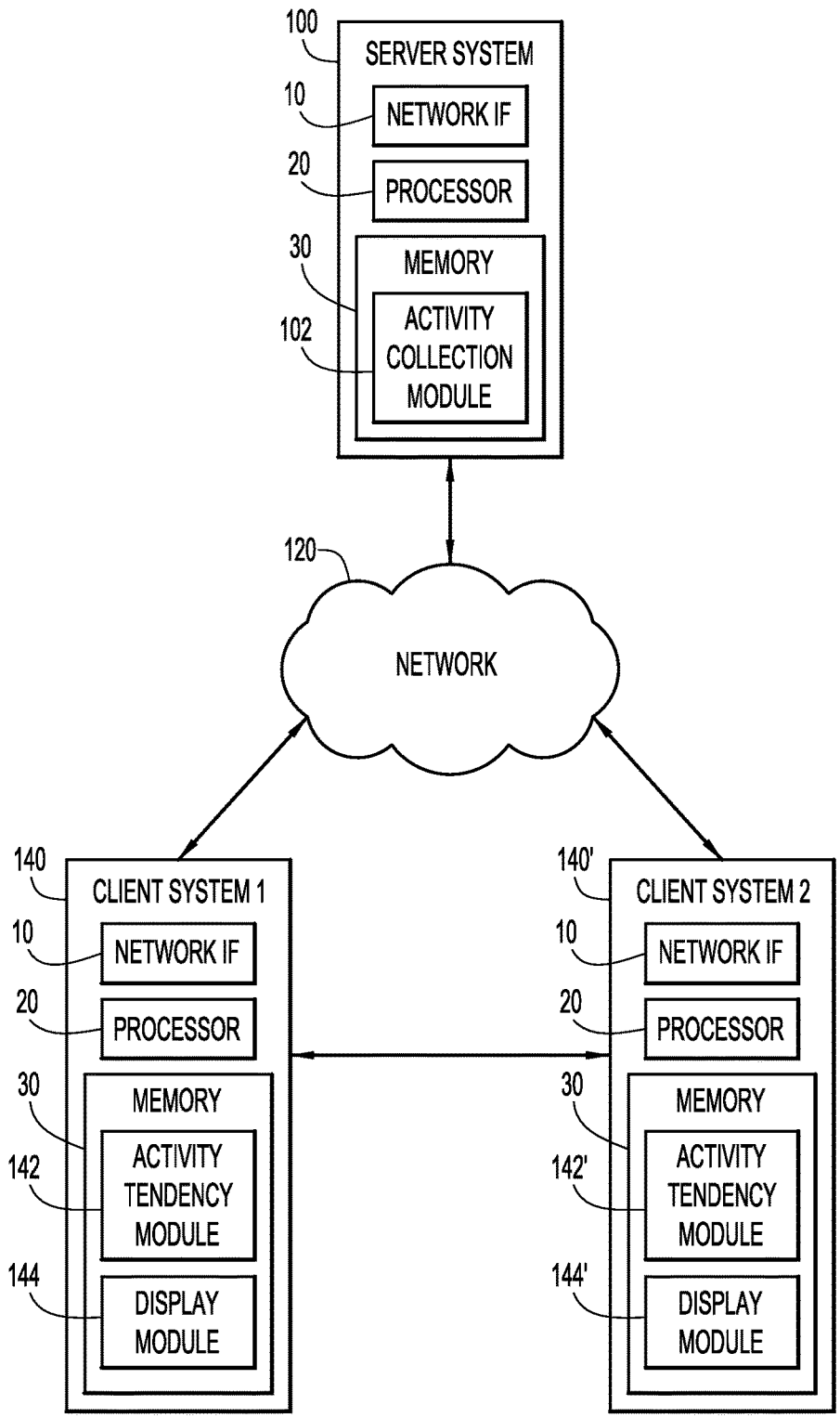
FIG. 1 is a diagrammatic illustration of an example of a computing environment for use with an embodiment of the present invention.

An example environment for use with present invention embodiments is illustrated in FIG. 1. Specifically, the environment includes one or more server systems 100, and one or more client or end-user systems 140, 140'. Server systems 10 and client systems 140, 140' may be remote from each other and communicate over a network 120. The network 120 may be implemented by any number of any suitable communications media (e.g., wide area network (WAN), local area network (LAN), Internet, Intranet, etc.). Alternatively, server systems 100 and client systems 140, 140' may be local to each other, and communicate via any appropriate local communication medium (e.g., local area network (LAN), hardwire, wireless link, Intranet, etc.).

Server systems 100 and client systems 140, 140' may be implemented by any conventional or other computer systems preferably equipped with a display or monitor, a base (e.g., including at least one processor 20, one or more memories 30 and/or internal or external network interfaces or communications devices 10 (e.g., modem, network cards, etc.)), optional input devices (e.g., a keyboard, mouse or other input device), and any commercially available and custom software (e.g., server/communications software, activity collection module, activity tendency module, browser/interface software, etc.).

Client systems 140, 140' enable users to establish communication links via communication channels (e.g., email, SMS/text messaging, tweeting, instant messaging, audio calls, video chats, etc.) with other client systems 140, 140' and/or the server system 100. The client systems 140, 140' may include an activity tendency module 142 that monitors the behavior tendencies/preferences of the client systems 140, 140' and a display module 144 that forms a display of the behavioral tendencies/preferences of the options of an activity. When the modules 142, 144 are used to monitor and display the behavioral tendencies/strengths of the activity of establishing a communication channel between multiple users, the behavioral tendencies/strengths may include which communication channels are available to each participant, the frequencies each of these channels have been used, the communication channel preference of each participant, the order that each participant ranks the communication channels in terms of familiarity, etc. The server system 100 may include an activity collection module 102 to collect the behavioral tendencies from a plurality of client systems 140, 140'.

Alternatively, one or more client systems 140, 140' may analyze the behavioral tendencies/preferences of a user for other activities such as working on a project, going out to eat, attending a movie/show, or attending a sporting event. The graphical user (e.g., GUI, etc.) or other interface (e.g., command line prompts, menu screens, etc.) solicits information from a corresponding user pertaining to the desired activity, and may provide reports including analysis results.

Modules 102, 142, 142', 144, 144' may include one or more modules or units to perform the various functions of present invention embodiments described below. The various modules (e.g., activity tendency module, display module, and activity collection module, etc.) may be implemented by any combination of any quantity of software and/or hardware modules or units, and may reside within memory 30 of the server 100 and/or client systems 140, 140' for execution by processor 20.

In the environment illustrated in FIG. 1, the activity tendency module 142, 142' of the client systems 140, 140' monitors the client system that it is installed on for various behavioral tendencies/preferences related to the options for performing an activity. Once an activity is to be established or performed, the display module 144, 144' creates a display of the behavioral tendencies/preferences of the options for that specific client system 140, 140'. Each of the client systems 140, 140' send to the server system 100 the monitored behavioral tendencies/preferences, where the activity collection module 102 of the server system 100 compiles all of the behavioral tendencies/preferences from each of the client systems 140, 140'. The server system 100 may then send a display of the behavioral tendencies/preferences back to the first client system 140, or to all of the client systems 140, 140'. The users of the client systems 140, 140' can analyze the behavioral tendencies/preferences on an interface provided by display modules 144, 144', and choose the best option for performing the activity.

Figure 2:
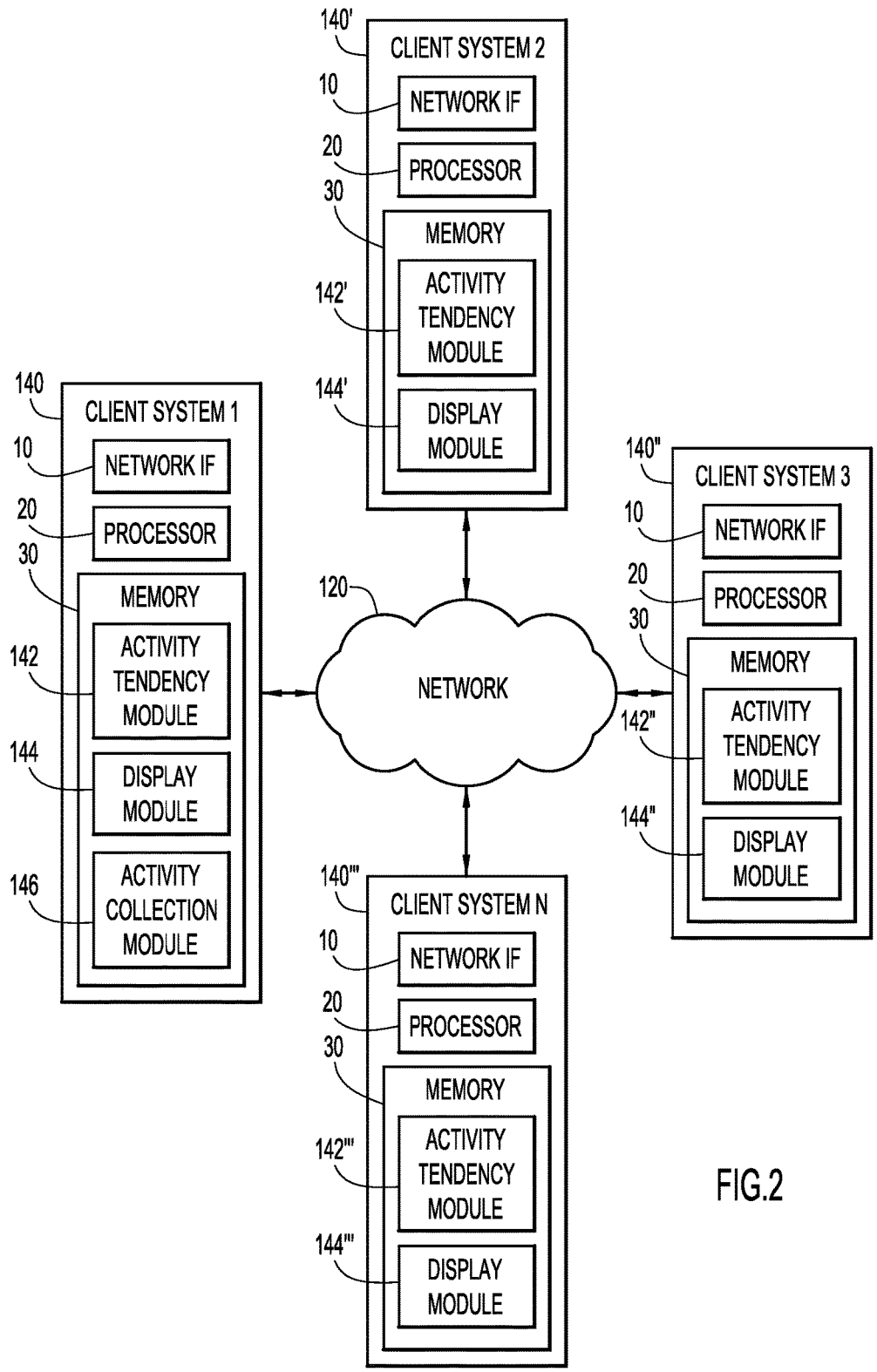
FIG. 2 is a diagrammatic illustration of a second example of a computing environment for use with an embodiment of the present invention.

A second example environment for use with present invention embodiments is illustrated in FIG. 2. Similarly to the first example illustrated in FIG. 1, the environment includes two or more client or end-user systems 140, 140', 140", 140''', but does not include the server system 100. Each of the client systems 140, 140', 140", 140''' communicate with one another via a network 120. Each one of the client systems 140, 140', 140", 140''' includes an activity tendency module 142, 142', 142", 142''' and a display module 144, 144', 144", 144'''. As explained previously, the activity tendency module 142, 142', 142", 142''' of a client system 140, 140', 140", 140''' monitors that respective client system 140, 140', 140", 140'" for various behavioral tendencies/preferences of options for performing an activity, and the display module 144, 144', 144", 144'" creates a display of the behavioral tendencies/preferences for the respective client systems 140, 140', 140", 140'" on which it is installed. The first client system 140, however, also includes an activity collection module 146, which collects all of the displays of the behavioral tendencies/preferences from all of the client systems 140, 140', 140", 140'". The first client system 140 may then display the collected behavioral tendencies/preferences to just the user of the first client system 140, or may send the collected behavioral tendencies/preferences to the various other client systems 140', 140", 140'". In yet another embodiment of the present invention, the other client systems may also contain an activity collection module.

Figure 3A:
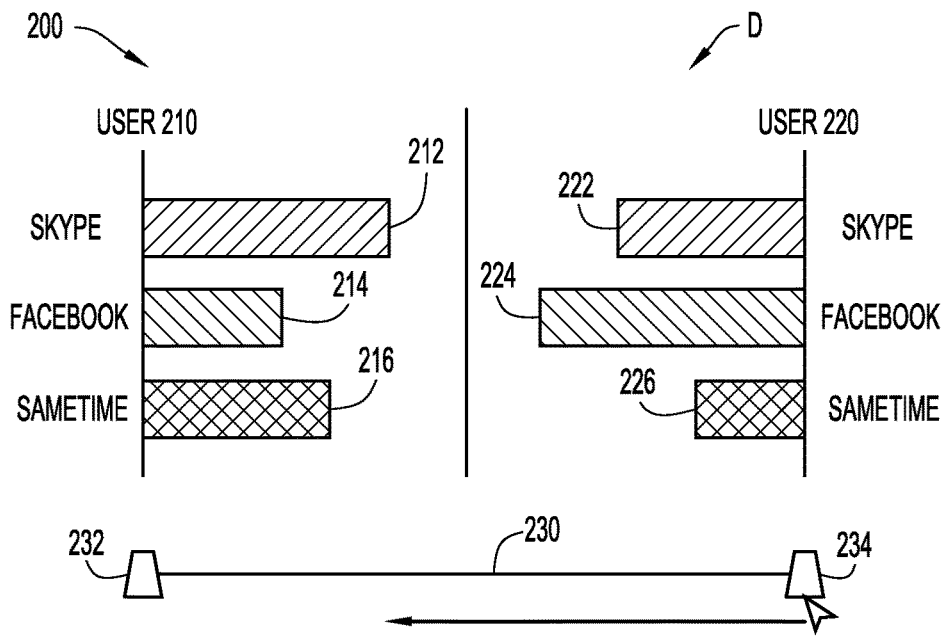
FIG. 3A is an example of a graphical user interface that displays the tendencies/behaviors/preferences of the options of an activity of two participants according to an embodiment of the present invention.
Figure 3B:
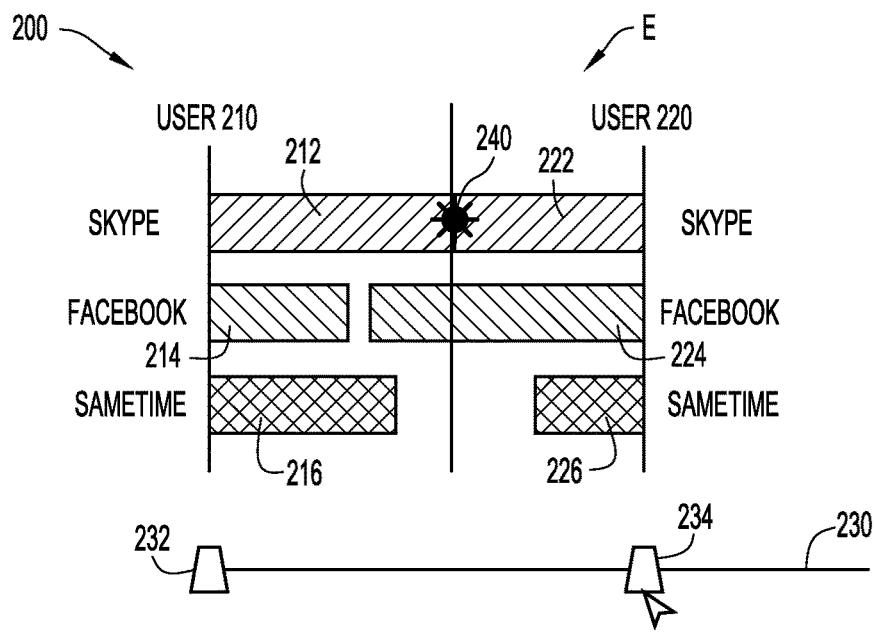
FIG. 3B is an interactive feature of the graphical user interface illustrated in FIG. 3A.

FIGS. 3A, 3B, 4A, 4B, and 4C illustrate an example of a display, or graphical user interface (GUI), of the behavioral tendencies/preferences between two users. As illustrated in FIGS. 3A and 3B, the GUI 200 is a chart containing a set of horizontal bar graphs for a first user 210 and a second user 220, where the bars 212, 214, 216 of the first user 210 extend towards the bars 222, 224, 226 of the second user 220, and vice versa. The GUI 200 displays that each user 210, 220 is capable of communicating with one another via three different channels, SKYPE, FACEBOOK, or SAMETIME. Thus, for the first user 210, the GUI 200 has a bar 212 that represents the first user's behavioral tendencies/preference for SKYPE, a bar 214 that represents the first user's behavioral tendencies/preference for FACEBOOK, and a bar 216 that represents the first user's behavioral tendencies/preference for SAMETIME. Similarly, for the second user 220, the GUI 200 has a bar 222 that represents the second user's behavioral tendencies/preference for SKYPE, a bar 224 that represents the second user's behavioral tendencies/preference for FACEBOOK, and a bar 226 that represents the second user's behavioral tendencies/preference for SAMETIME. The bars 212, 214, 216, 222, 224, 226 are proportional to the relative tendency/preference value for each of the users 210, 220. These tendency/preference values may be determined by an activity collection module based on the numeral weights, scores, etc. that are calculated for criteria related to which communication channels are available to each participant, the frequencies each of these channels have been used, the communication channel preference of each participant, the order that each participant ranks the communication channels in terms of familiarity, etc.

As best illustrated in FIG. 3A, the first user 210 has a stronger tendency/preference towards SKYPE, a second strongest tendency/preference towards SAMETIME, and the least tendency/preference for FACEBOOK. The second user 220 has a stronger tendency/preference towards FACEBOOK, a second strongest tendency/preference towards SKYPE, and the least tendency/preference towards SAMETIME. Thus, the first and second users 210, 220 differ on their tendencies/preferences for communication. If one of the users refused to use one of the communication channels, or did not have the necessary capability for implementing a specific communication channel, the GUI 200 may not display a bar for that user for that specific communication channel.

FIGS. 3A and 3B illustrate a slider bar 230 positioned beneath the displayed communication channels of the first user 210 and the displayed communication channels of the second user 220. The slider bar 230 may include a first user button 232 and a second user button 234. As illustrated by the difference between FIGS. 3A and 3B, the slider buttons 232, 234 may be configured to be slid along the slider bar 230. First user slider button 232 controls the positioning of the bars for the communication channels of the first user 210, while second user slider button 234 controls the positioning of the bars for the communication channels of the second user 220. As illustrated in FIG. 3B, the second user slider button 234 has been slid along the slider bar 230 to cause the tendency/preference bars 222, 224, 226 of the second user 220 to move towards the tendency/preference bars 212, 214, 216 of the first user 210. FIG. 3B illustrates that as the second user slider button 234 is slide to the left, the SKYPE tendency/preference bar 212 of the first user 210 contacts the SKYPE tendency/preference bar 222 of the second user 220 before any of the other tendency/preference bars 214, 216 of the first user 210 contact any of the other tendency/preference bars 224, 226 of the second user 220. This contact between the SKYPE bars 212, 222 demonstrates that the Skype communication channel is the communication channel that is best used for communications between these two users 210, 220. Thus, FIG. 3A illustrates a GUI 200 where the tendency/preference values 212, 214, 216 of the first user 210 and the tendency/preference values 222, 224, 226 of the second user 220 are in a separated position D, while FIG. 3B illustrates a GUI 200 where the tendency/preference values 212, 214, 216 of the first user 210 and the tendency/preference values 222, 224, 226 of the second user 220 are in a contacted position E. While FIG. 3B only illustrates the movement of the second user slider button 234, both the first user slider button 232 and the second user slider button 234 may be slid along the slider bar 230.

Once two tendency/preference bars have contacted each other, a connection indicator 240 is formed on the GUI 200. In some embodiments, the connection indicator 240 may be configured to automatically form a communication link between the two users 210, 220 via the communication channel that has the tendency/preference values first come in contact with each other. In another embodiment, the connection indicator 240 may be configured to display a set of prompts to the users 210, 220 for establishing a communication link via the connection of the communication channel that caused the connection indicator 240 to be displayed. If the first communication link does not establish a communication link, or is not selected, a slider button 232, 234 may be further advanced until the tendency/preference bars 214, 216, 224, 226 of a second communication channel contact one another, creating another connection indicator 240.

Figure 4A:
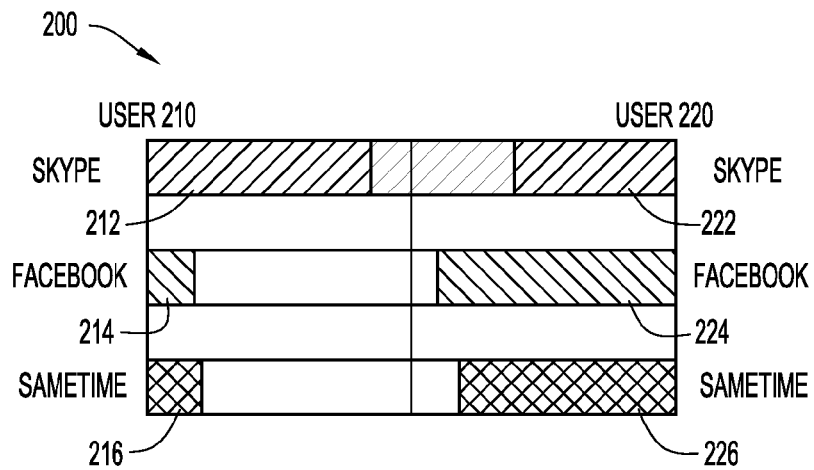
FIG. 4A is the graphical user interface of FIG. 3A, where the greatest consensus option of the between the participants is highlighted
Figure 4B:
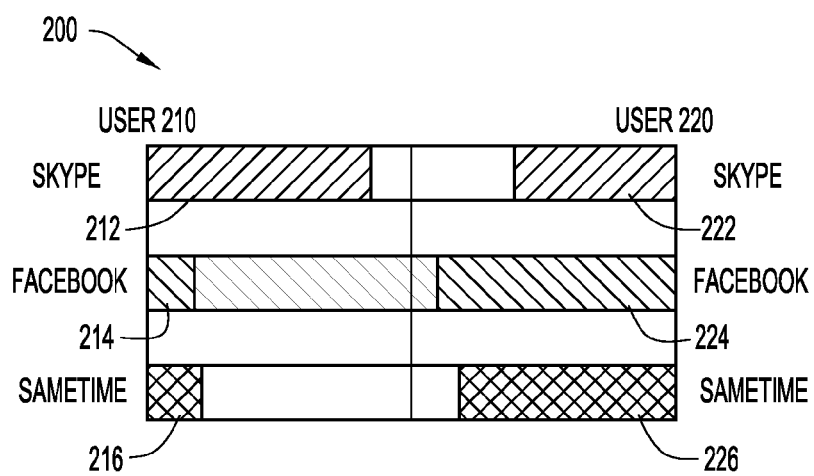
FIG. 4B is the graphical user interface of FIG. 3A, where the most preferred option between the participants is highlighted.
Figure 4C:
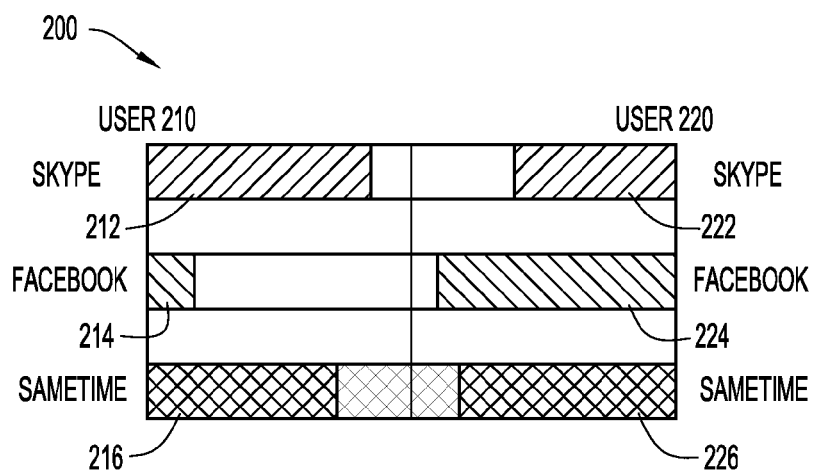
FIG. 4C is the graphical user interface of FIG. 3A, where the least disliked option between the participants is highlighted.

FIGS. 4A, 4B, and 4C illustrate a similar GUI 200 to that of FIGS. 3A and 3B. However, the GUI 200 of FIGS. 4A, 4B, and 4C does not include a slider bar 230 with slider buttons 232, 234. Instead, each set of aligned tendency/preference bars (tendency/preference bars 212 and 222 for SKYPE, tendency/preference bars 214 and 224 for FACEBOOK, and tendency/preference bars 216 and 226 for SAMETIME) serve as a push button for selecting that communication channel. In other words, a user 210, 220 may select a set of aligned preference bars for one of the communication channels to initiate a communication link via that communication channel. FIGS. 4A, 4B, and 4C illustrate the application of different rules or guidelines for determining the best choice for the communication channel, and how the application of the rules or guidelines results in different choices for the best communication channel.

The GUI 200 in FIG. 4A displays that the first user 210 has the strongest tendency/preference towards SKYPE, a second strongest tendency/preference towards SAMETIME, and the least tendency/preference for FACEBOOK. The GUI 200 also displays that the second user 220 has the strongest tendency/preference towards FACEBOOK, a second strongest tendency/preference towards SAMETIME, and the least tendency/preference towards SKYPE. FIG. 4A illustrates the application of the greatest consensus, or largest sum, guidelines to the tendency/preference values for each communication channel. The greatest consensus guideline sums the tendency/preference values of all of the users 210, 220 for each communication channel and highlights the communication channel with the largest combined tendency/preference value. As described above, the tendency/preference values may be determined based on the numeral weights, scores, etc. that are calculated for criteria related to which communication channels are available to each participant, the frequencies each of these channels have been used, the communication channel preference of each participant, the order that each participant ranks the communication channels in terms of familiarity, etc. As illustrated in FIG. 4A, the SKYPE communication channel has the largest combined tendency/preference value when combining tendency/preference bar 212 of the first user 210 and tendency/preference bar 222 of the second user 220, and thus, the SKYPE communication channel is highlighted. A user 210, 220 may select the highlighted SKYPE communication channel to establish a connection with all of the users 210, 220 via SKYPE.

FIG. 4B illustrates the application of the most preferred guideline to the tendency/preference values for each communication channel. The most preferred guideline highlights the communication channel that contains the largest single user tendency/preference value. As illustrated in FIG. 4B, the GUI 200 displays that the first user 210 has the strongest tendency/preference towards SKYPE, a second strongest tendency/preference towards SAMETIME, and the least tendency/preference for FACEBOOK. The GUI 200 also displays that the second user 220 has the strongest tendency/preference towards FACEBOOK, a second strongest tendency/preference towards SAMETIME, and the least tendency/preference towards SKYPE. As illustrated in FIG. 4B, the tendency/preference value 224 for FACEBOOK for the second user 220 is larger than the tendency/preference value 212 for SKYPE for the first user 210, indicating that the second user 220 prefers FACEBOOK more than the first user 210 prefers SKYPE. Thus, using the most preferred guideline, the FACEBOOK communication channel 224 is highlighted because it has the single largest tendency/preference value.

FIG. 4C illustrates the application of the least disliked guideline to the tendency/preference values for each communication channel. The least disliked guideline highlights the communication channel that does not contain the lowest tendency/preference value from a single user. The least disliked guideline is often used when strong differences between the tendency/preference values of the most preferred options for each user do not exist. As illustrated in FIG. 4C, the GUI 200 displays that the first user 210 has the strongest tendency/preference towards SKYPE, a second strongest tendency/preference towards SAMETIME, and the least tendency/preference for FACEBOOK. The GUI 200 also displays that the second user 220 has the strongest tendency/preference towards FACEBOOK, a second strongest tendency/preference towards SAMETIME, and the least tendency/preference towards SKYPE. Because the first user 210 has the lowest tendency/preference value for FACEBOOK 214, and the second user 220 has the lowest tendency/preference value for SKYPE 222, the tendency/preference values 216, 226 for SAMETIME is highlighted using the least disliked guidelines. Because SAMETIME is not strongly disliked by either the first user 210 or the second user 220, the SAMETIME communication channel is highlighted.

Figure 5A:
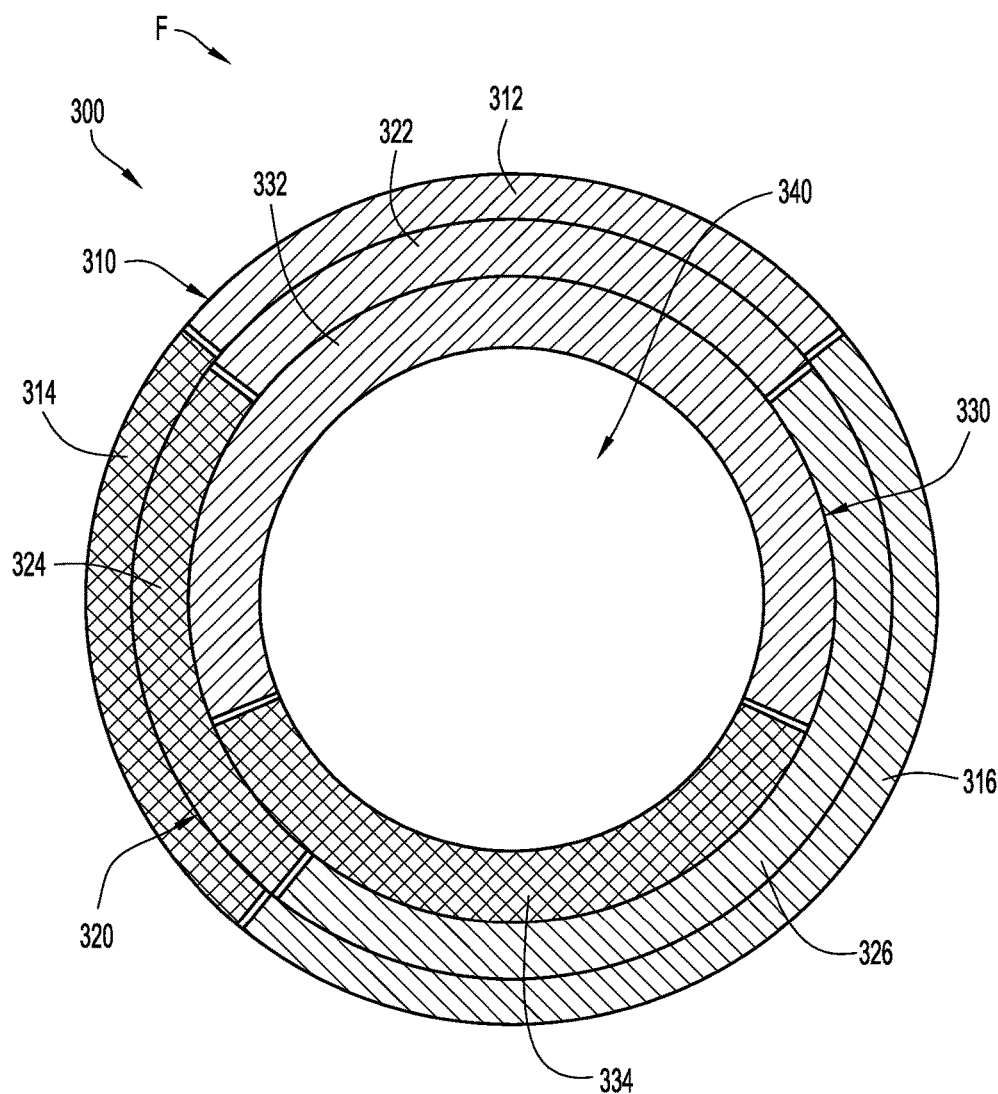
FIG. 5A is a second example of a graphical user interface that displays the tendencies/behaviors/preferences of the options of an activity between more than two participants, the values of the first option of each participant are aligned according to an embodiment of the present invention.
Figure 5B:
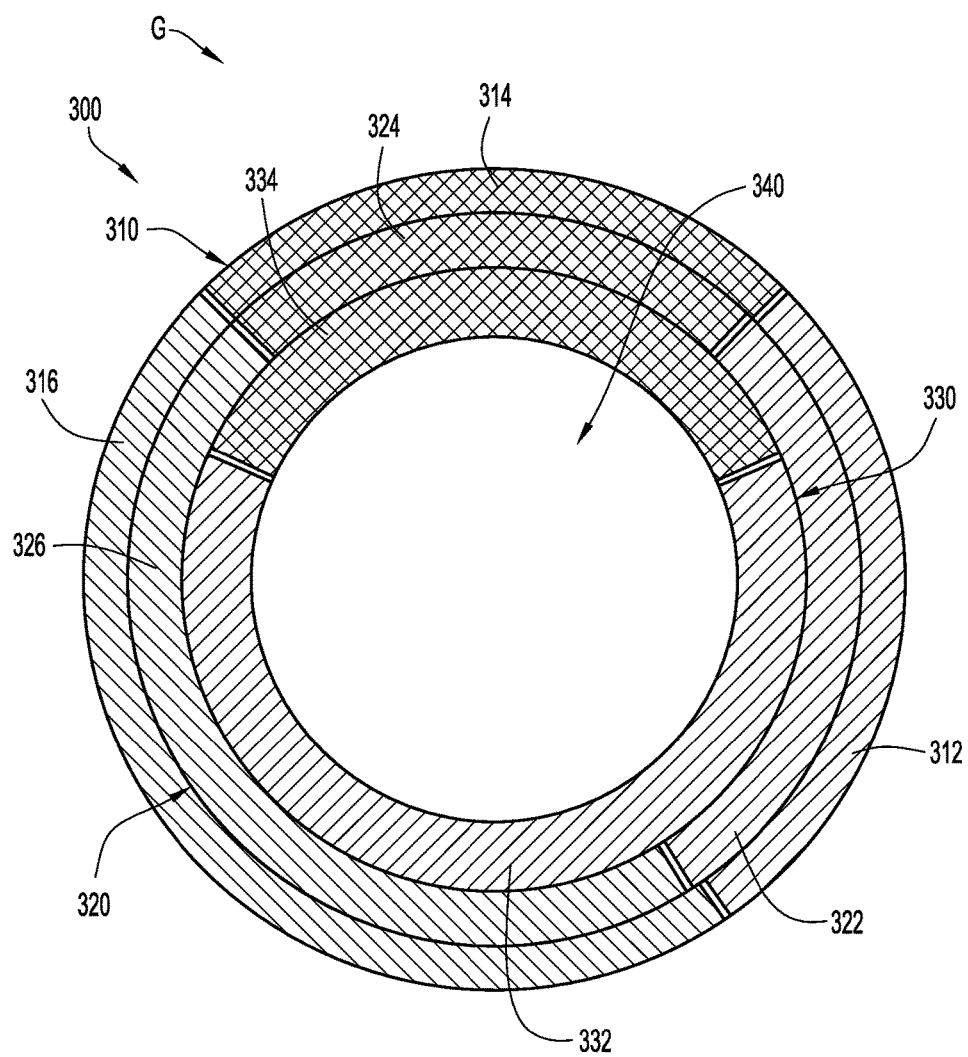
FIG. 5B is the graphical user interface of FIG. 5A, where the values of the second option of each participant are aligned.

Turning to FIGS. 5A and 5B, illustrated is a second example of a GUI 300, where the GUI 300 combines the tendency/preference values of multiple communication channels for more than two users. As described above, the tendency/preference values may be determined based on the numeral weights, scores, etc. that are calculated for criteria related to which communication channels are available to each participant, the frequencies each of these channels have been used, the communication channel preference of each participant, the order that each participant ranks the communication channels in terms of familiarity, etc. While FIGS. 3A, 3B, 4A, 4B, and 4C illustrate GUI's 200 that compare tendency/preference values, the GUI's 200 illustrated in FIGS. 3A, 3B, 4A, 4B, and 4C can only be used for the comparison of two users 210, 220. FIGS. 5A and 5B illustrate a GUI 300 constructed of multiple concentric bands, where each band represents the tendency/preference values of a user. The outer band 310 illustrated in FIGS. 5A and 5B represents a first user, the middle band 320 represents a second user, and the inner band 330 represents a third user. The tendency/preference bands 310, 320, 330 may surround a central area 340. While FIGS. 5A and 5B illustrate only three bands, bands may be added or subtracted to represent adding or subtracting users. For example, if the GUI 300 of FIGS. 5A and 5B were to represent the tendency/preference values of five users, then the GUI 300 would include five concentric bands.

As illustrated in FIGS. 5A and 5B, the first user 310 has tendency/preference values for a first communication channel 312, a second communication channel 314, and a third communication channel 316. The second user 320 has tendency/preference values for the first communication channel 322, the second communication channel 324, and the third communication channel 326. Finally, the third user 330 has tendency/preference values for only the first communication channel 332 and the second communication channel 334. Because the third user 330 may not have the ability or preference to use the third communication channel, the third user 330 does not have a tendency/preference value for the third communication channel.

Because a complete band represents each user 310, 320, 330, the tendency/preference values of the communication channels for each user 310, 320, 330 must add up to the same amount. Thus, each tendency/preference value represents a percentage of a total, and all of the tendency/preference values for each user must equate to 100%. Thus, the GUI 300 example is useful when the tendency/preference values might be based on a percentage. For example, the tendency/preference values may be based on the proportion of time each user chooses each one of the communication channels. As illustrated in FIGS. 5A and 5B, the first user 310 has the largest tendency/preference value for the third communication channel 316, and about equal tendency/preference values for the first communication channel 312 and the second communication channel 314. Similarly, the second user 320 has the largest tendency/preference value for the third communication channel 326, and about equal tendency/preference values for the first communication channel 322 and the second communication channel 324. However, the third user 330 has the largest tendency/preference value for the first communication channel 332, the second largest tendency/ preference value for second communication channel 334, and does not have a tendency/preference value for the third communication channel.

FIG. 5A illustrates a GUI 300 in a first orientation F, where the tendency/preference values for the first communication channels 312, 322, 332 are aligned with one another for each of the users 310, 320, 330. The GUI 300 illustrated in FIG. 5B is in a second orientation G, where the tendency/preference values for the second communication channels 314, 324, 334 are aligned with one another for each of the users 310, 320, 330. The GUI 300 may be set to guidelines that automatically determine the greatest consensus, which is the first orientation F. Thus, as the GUI is displayed, the bands 310, 320, 330 may be initially rotated to align the communication channel having the greatest consensus of tendency/preference values. However, a user 310, 320, 330 may select one of the misaligned tendency/preference values to align the bands 310, 320, 330 to that specific option. For example, to switch from the first orientation F of the GUI 300 to the second orientation G, a user may select one of the second communication channel tendency/preference values, causing the bands 310, 320, 330 to rotate to align all of the tendency/preference values for the second communication channel, as illustrated in FIG. 5B.

The GUI 300 further includes a central area 340. In some embodiments of the GUI 300, selection of the central area 340 may initiate a communication link between users 310, 320, 330 via that communication channel that has aligned tendency/preference values at the time the central area 340 is selected. However, in other embodiments of GUI 300, once the tendency/preference values are aligned for a specific communication channel, selecting one of those aligned tendency/preference values again may establish a communication link between users 310, 320, 330 via the aligned communication channel.

While FIGS. 5A and 5B illustrate a GUI 300 that is best suited for tendency/preference values that sum to unity (100%) or a common total, FIGS. 6A, 6B, 6C, and 6D illustrate a GUI 400 for tendency/preference values that do not sum to unity or a common total. Thus, the tendency/preference values illustrated in FIGS. 6A, 6B, 6C, and 6D might be based on user ratings or rankings. The GUI 400 illustrated in FIG. 6A may be defined by a circular area with a set of tendency/preference bars 410, 420, 430 radiating from a set of centrally located circles 442, 444, 446 in the central area 440 of the GUI 400. The tendency/preference bars 410, 420, 430 radiate from the central area 440 of the GUI 400 to the edge of the GUI 400. Each preference bar 410, 420, 430 represents a set of stacked tendency/preference values for multiple communication channels for each user A, B, C. The bars 410, 420, 430 located to the right of the GUI 400 may be for illustrative and informational purposes only, and do not form a part of the GUI 400. The bars 410, 420, 430 located to the right of the GUI 400 are representations of the bars 410, 420, 430 that are positioned equidistant from each other around the central area 440 of the GUI 400. The bar 410 radiating from the bottom of the central area 440 of the GUI 400 represents the tendency/preference values of user A, and is equivalent to the first bar 410 located to the right of the GUI 400. The bar 420 radiating from the upper right of the central area 440 of the GUI 400 represents the tendency/preference values of user B, and is equivalent to the second bar 420 located to the right of the GUI 400. Finally, the bar 430 radiating from the upper right of the central area 440 of the GUI 400 represents the tendency/preference values of user C, and is equivalent to the third bar 430 located to the right of the GUI 400. As described above, the tendency/preference values may be determined based on the numeral weights, scores, etc. that are calculated for criteria related to which communication channels are available to each participant, the frequencies each of these channels have been used, the communication channel preference of each participant, the order that each participant ranks the communication channels in terms of familiarity, etc.

Figure 6A:
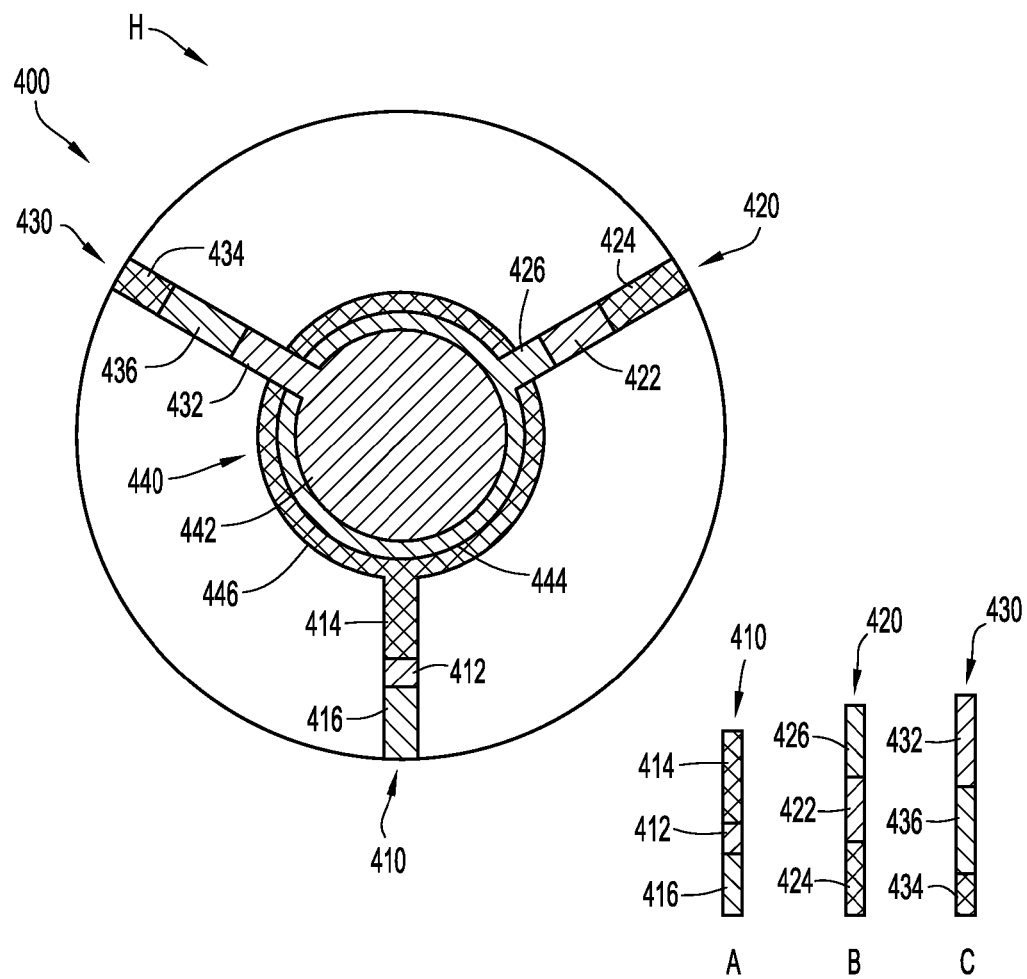
FIG. 6A is a third example of a graphical user interface that displays the tendencies/behaviors/preferences of the options of an activity between more than two participants, where the center of the display displays the most preferred option according to an embodiment of the present invention.

The tendency/preference bars 410, 420, 430 extend from the outer circumference of the GUI 400 towards the central area 440 of the GUI 400, where the stacked tendency/preference values closer to the outer circumference of the GUI 400 represent a lower tendency/preference value than those located proximate to the central area 440. The tendency/preference values increases as the bar extends from the outer circumference of the GUI 400 to the central area 440. Because each bar 410, 420, 430 is a set of stacked tendency/preference values for each communication channel, the stacked tendency/preference values for each communication channel may be colored or shaded differently from one another. For example, the first communication channel may be represented by a green color, the second communication channel may be represented by an orange color, and the third communication channel may be represented by a blue color. In other embodiments of the present invention, the stacked tendency/preference values for each communication channel may be shaded by a design, rather than a color. As illustrated in FIG. 6A, the tendency/preference bar 410 displayed by GUI 400 for user A shows that user A has the strongest tendency/preference towards the second communication channel 414, a second strongest tendency/preference towards the first communication channel 412, and the least tendency/preference for the third communication channel 416. Furthermore, the tendency/preference bar 420 displayed in GUI 400 for user B shows that user B has the strongest tendency/preference towards the third communication channel 426, a second strongest tendency/preference towards the first communication channel 422, and the least tendency/preference for the second communication channel 424. The tendency/preference bar 430 displayed in GUI 400 for user C shows that user C has the strongest tendency/preference towards the first communication channel 432, a second strongest tendency/preference towards the third communication channel 436, and the least tendency/preference for the second communication channel 434.

The GUI 400 illustrated in FIG. 6A is an embodiment of the GUI 400 that is displaying the comparison of the preference/rating values from users A, B, and C by applying the most preferred guidelines, which were explained previously. As displayed by GUI 400, the central area 440 is made up of a central circle 442 with two bands 444, 446 concentrically located around the central circle 442. When GUI 400 applies the most preferred guideline to choosing the best communication channel, the central area displays three circles 442, 444, 446 concentrically stacked on top of one another. The first central circle 442 is shaded to that of the most preferred communication channel. The second central circle 444 is shaded to that of the second most preferred communication channel. The second central circle 444 is shown as the first concentric band in FIG. 6A because the second central circle 444 has a larger diameter than the first central circle 442 but is concentrically positioned beneath the first central circle 442. In addition, the third central circle 446 is shaded to that of the least preferred communication channel. The third central circle 446 is shown as the second concentric band in FIG. 6A because the third central circle 446 has the largest diameter of the central circles 442, 444, 446, and is concentrically positioned beneath the first and second central circle 442, 444. The larger diameters of the second and third central circles 444, 446 enables the GUI 400 to display the order of the communication channels, with the first central circle 442 displaying the most preferred communication channel.

As illustrated in FIG. 6A, user A most prefers the second communication channel 414, user B most prefers the third communication channel 426, and user C most prefers the first communication channel 432. However, user C prefers the first communication channel 432 to a greater degree than user B prefers the third communication channel 426 and a greater degree than user A prefers the second communication channel 414. Furthermore, user B prefers the third communication channel 426 to a greater degree than user A prefers the second communication channel 414. Thus, the first central circle 442 of the central area 440 is shaded to represent the first communication channel, the second central circle 444 is shaded to represent the third communication channel, and the third central circle 446 is shaded to represent the second communication channel.

Turning to FIG. 6B, illustrated is a set of GUI's 400 that demonstrate the ability of a user to interact with the GUI 400 to cycle through the different communication channels. The GUI 400 illustrated in FIG. 6B is the same GUI 400 illustrated in FIG. 6A, where the GUI 400 presents the order of the communication channels using the most preferred guideline. As previously explained, based on the tendency/preference values from users A, B, and C, the first communication channel is the most preferred channel, the third communication channel is the second most preferred channel, and the second communication channel is the least preferred communication channel. FIG. 6A and the first GUI 400 illustrated on the left of FIG. 6B show the GUI 400 in the first configuration H, where the central area 440 displays all three central circles 442, 444, 446. The GUI 400 illustrated in the middle of FIG. 6B illustrates the second configuration I of the GUI 400, where the central area 440 displays the second and third central circles 444, 446 without displaying the first central circle 442. The GUI 400 illustrated on the right of FIG. 6B is in the third configuration J, where the central area 440 displays only the third central circle 446.

The GUI's 400 illustrated second from the left and second from the right include arrows X that are pointed in the substantially downward direction. The arrows X represents a user interaction with the GUI 400, where a user may select and swipe or drag the central area 440 of the GUI 400 in the downward direction of arrow X to cycle the central area 440 between the central circles 442, 444, 446. The second GUI 400 from the left of FIG. 6B illustrates the first configuration H with an arrow X, where performing the action of selecting and swiping the central area 440 in the direction of arrow X changes the central area 440 from primarily displaying the first central circle 442 to primarily displaying the second central circle 444. Similarly, the second GUI 400 from the right of FIG. 6B illustrates the second configuration I with an arrow X, where performing the action of selecting and swiping the central area 440 in the direction of arrow X changes the central area 440 from primarily displaying the second central circle 444 to primarily displaying the third central circle 446. While not illustrated, selecting and swiping the central area 440 of the GUI 400 in a substantially upward direction may cycle through the central circles 442, 444, 446 in the direction opposite of that when selecting and swiping the central area 440 of the GUI 400 in the direction of arrow X. In other embodiments, a user may be able to select and swipe the central region 440 of the GUI 400 in directions other than substantially upwardly and substantially downwardly to cycle through the central circles 442, 444, 446.

In addition, selection of the central area 440 may initiate a communication link between users A, B, and C via the communication channel that is represented by the central circle 442, 444, 446 that is primarily displayed. Thus, when the GUI 400 is in the first configuration H, where the first central circle 442 is primarily displayed, selection of the central area 440 will establish a communication link via the first communication channel. When the second central circle 444 is primarily displayed, when the GUI 400 is in the second configuration I, selection of the central area 440 will establish a communication link via the third communication channel. Finally, when the third central circle 446 is primarily displayed, when the GUI 400 is in the third configuration J, selection of the central area 440 will establish a communication link via the second communication channel.

Figure 6C:
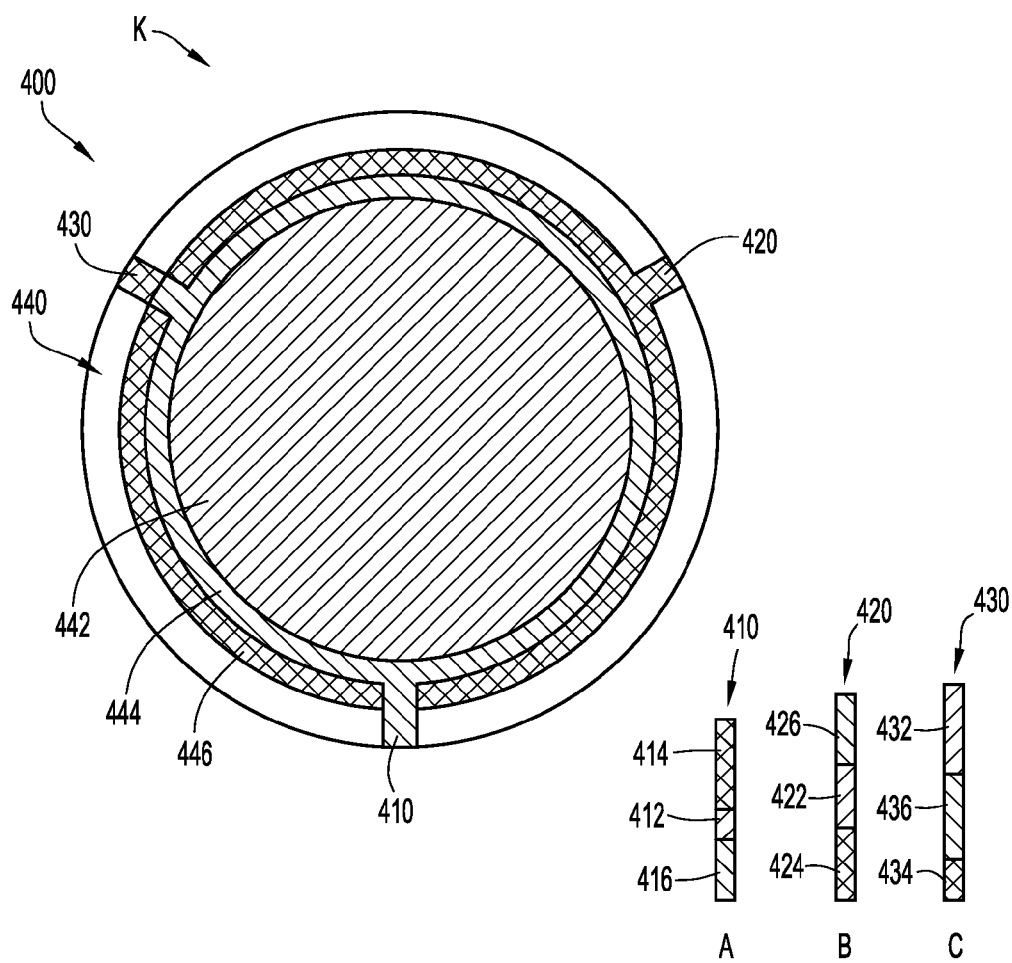
FIG. 6C is the graphical user interface of FIG. 6A, where the center of the display displays the least disliked option.

Turning to FIG. 6C, illustrated is the GUI 400 from FIG. 6A, but with the least disliked guideline applied instead of the most preferred guideline to determined the best communication channel to be used by users A, B, and C to communicate with each other. As illustrated in FIG. 6C, the GUI 400 is defined by a circular area with a set of tendency/preference bars 410, 420, 430 radiating from a set of centrally located circles 442, 444, 446 to the edge of the GUI 400. Each tendency/preference bar 410, 420, 430 represents a set of stacked tendency/preference values of multiple communication channels for each user. As previously explained, the bars 410, 420, 430 located to the right of the GUI 400 may be for illustrative and informational purposes only, and are representations of the bars 410, 420, 430 that are positioned equidistant from each other around the central area 440 of the GUI 400.

Similar to those illustrated in FIG. 6A, the tendency/preference bars 410, 420, 430 illustrated in FIG. 6C extend from the outer circumference of the GUI 400 towards the central area 440 of the GUI 400, where the stacked tendency/preference values proximate to the outer circumference of the GUI 400 represent a lower tendency/preference value than those located proximate to the central area 440. The tendency/preference values increase as the bars extend from the outer circumference of the GUI 400 to the central area 440. Because each bar 410, 420, 430 is a set of stacked tendency/preference values for each communication channel, the stacked tendency/preference bars may be colored or shaded differently from one another. For example, the first communication channel may be represented by a green color, the second communication channel may be represented by an orange color, and the third communication channel may be represented by a blue color.

As illustrated in FIG. 6C, the tendency/preference bar 410 displayed by GUI 400 for user A shows that user A has the strongest tendency/preference towards the second communication channel 414, a second strongest tendency/preference towards the first communication channel 412, and the least tendency/preference for the third communication channel 416. Furthermore, the tendency/preference bar 420 displayed in GUI 400 for user B shows that user B has the strongest tendency/preference towards the third communication channel 426, a second strongest tendency/preference towards the first communication channel 422, and the least tendency/preference for the second communication channel 424. The tendency/preference bar 430 displayed in GUI 400 for user C shows that user C has the strongest tendency/ preference towards the first communication channel 432, a second strongest tendency/preference towards the third communication channel 436, and the least tendency/preference for the second communication channel 434.

By applying the least disliked guideline as applied in FIG. 6C, user A dislikes the third communication channel 416 the most, and dislikes the first communication channel 412 the second most. User B dislikes the second communication channel 424 the most, and dislikes the first communication channel 422 the second most. User C dislikes the second communication channel 434 the most, and dislikes the third communication channel 436 the second most. Because users B and C dislike the second communication channel 424, 434 the most, and because user A dislikes the third communication channel 416 more than user A dislikes first communication channel 412, the least disliked communication channel between all of the users A, B, C is the first communication channel. Furthermore, the second least disliked communication channel is the third communication channel, and the most disliked communication channel is the second communication channel.

Similar to that of FIG. 6A, FIG. 6C illustrates the central area 440 as having a first central circle 442, a second central circle 444, and a third central circle 446, where the central circles 442, 444, 446 are concentrically placed on top of each other. The first central circle 442 is shaded to that of the least disliked communication channel. The second central circle 444 is shaded to that of the second least disliked communication channel. The second central circle 444 is shown as the first concentric band in FIG. 6C because the second central circle 444 has a larger diameter than the first central circle 442 but is concentrically positioned beneath the first central circle 442. In addition, the third central circle 446 is shaded to that of the most disliked communication channel. The third central circle 446 is shown as the second concentric band in FIG. 6A because the third central circle 446 has the largest diameter of the central circles 442, 444, 446, and is concentrically positioned beneath the first and second central circle 442, 444.

As similarly explained in FIG. 6B, a user may be able to select and swipe in different directions the central area 440 of GUI 400 in FIG. 6C to primarily display one of the central circles 442, 444, 446. In addition, selecting the central circle 442, 444, 446 that is primarily displayed may establish a communication link between the users A, B, and C via the communication channel that is represented by the central circle 442, 444, 446 primarily displayed.

Figure 6D:
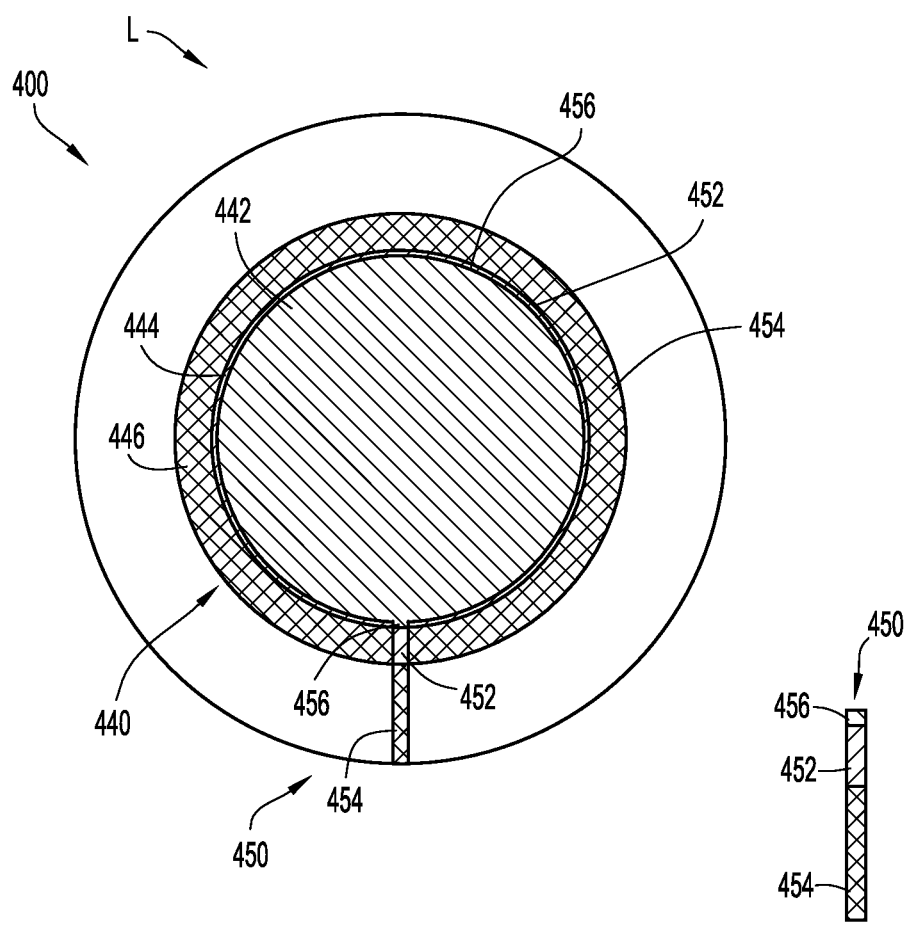
FIG. 6D is the graphical user interface of FIG. 6A, where the center of the display displays the greatest consensus of the options.

Turning to FIG. 6D, illustrated is the GUI 400 of FIGS. 6A, 6B, and 6C, where the GUI 400 in FIG. 6D is applying the greatest consensus guideline to determine the best communication channel to be used to communicate with users A, B, and C. Unlike the GUI 400 illustrated in FIGS. 6A, 6B, and 6C, the GUI 400 illustrated in FIG. 6D only includes one stacked tendency/preference bar 450. Moreover, the GUI 400 is defined by a circular area with the single tendency/preference bar 450 extending from a set of centrally located circles 442, 444, 446 to the edge of the GUI 400. The tendency/preference bar 450 represents a set of stacked tendency/preference values of multiple communication channels for multiple users. The preference bar 450 located to the right of the GUI 400 may be for illustrative and informational purposes only, and is a representation of the bar 450 disposed in the GUI 400.

The tendency/preference bar 450 illustrated in FIG. 6D extends from the outer circumference of the GUI 400 towards the central area 440 of the GUI 400, where the stacked tendency/preference values closer to the outer circumference of the GUI 400 represent a lower tendency/preference value than those located proximate to the central area 440. The tendency/preference values increase as the bar 450 extends from the outer circumference of the GUI 400 to the central area 440. Because the greatest consensus guideline is applied to the tendency/preference values in FIG. 6D, the bar 450 represents an aggregate of the tendency/preference values from all of the users, rather than each user being represented by a preference bar. As described above, the tendency/preference values may be determined based on the numeral weights, scores, etc. that are calculated for criteria related to which communication channels are available to each participant, the frequencies each of these channels have been used, the communication channel preference of each participant, the order that each participant ranks the communication channels in terms of familiarity, etc. As illustrated in FIG. 6D, when using the greatest consensus guideline, the third communication channel 456 is the most preferred communication channel, the first communication channel 452 is the second most preferred communication channel, and the second communication channel 454 is the least preferred communication channel.

Similar to the GUI's 400 illustrated in FIGS. 6A, 6B, and 6C, FIG. 6D illustrates the central area 440 as having a first central circle 442, a second central circle 444, and a third central circle 446, where the central circles 442, 444, 446 are concentrically placed on top of each other. The first central circle 442 is shaded to that of the combined greatest preferred communication channel. The second central circle 444 is shaded to that of the combined second greatest preferred communication channel. The second central circle 444 is shown as the first concentric band in FIG. 6D because the second central circle 444 has a larger diameter than the first central circle 442 but is concentrically positioned beneath the first central circle 442. In addition, the third central circle 446 is shaded to that of the combined least preferred communication channel. The third central circle 446 is shown as the second concentric band in FIG. 6D because the third central circle 446 has the largest diameter of the central circles 442, 444, 446, and is concentrically positioned beneath the first and second central circle 442, 444.

As similarly explained in FIG. 6B and for FIG. 6C, a user may be able to select and swipe the central area 440 of the GUI 400 in FIG. 6D in different directions to primarily display one of the central circles 442, 444, 446. In addition, selecting the central circle 442, 444, 446 primarily displayed may establish a communication link between the multiple users via the communication channel represented by the central circle 442, 444, 446 that is primarily displayed.

Figure 7:
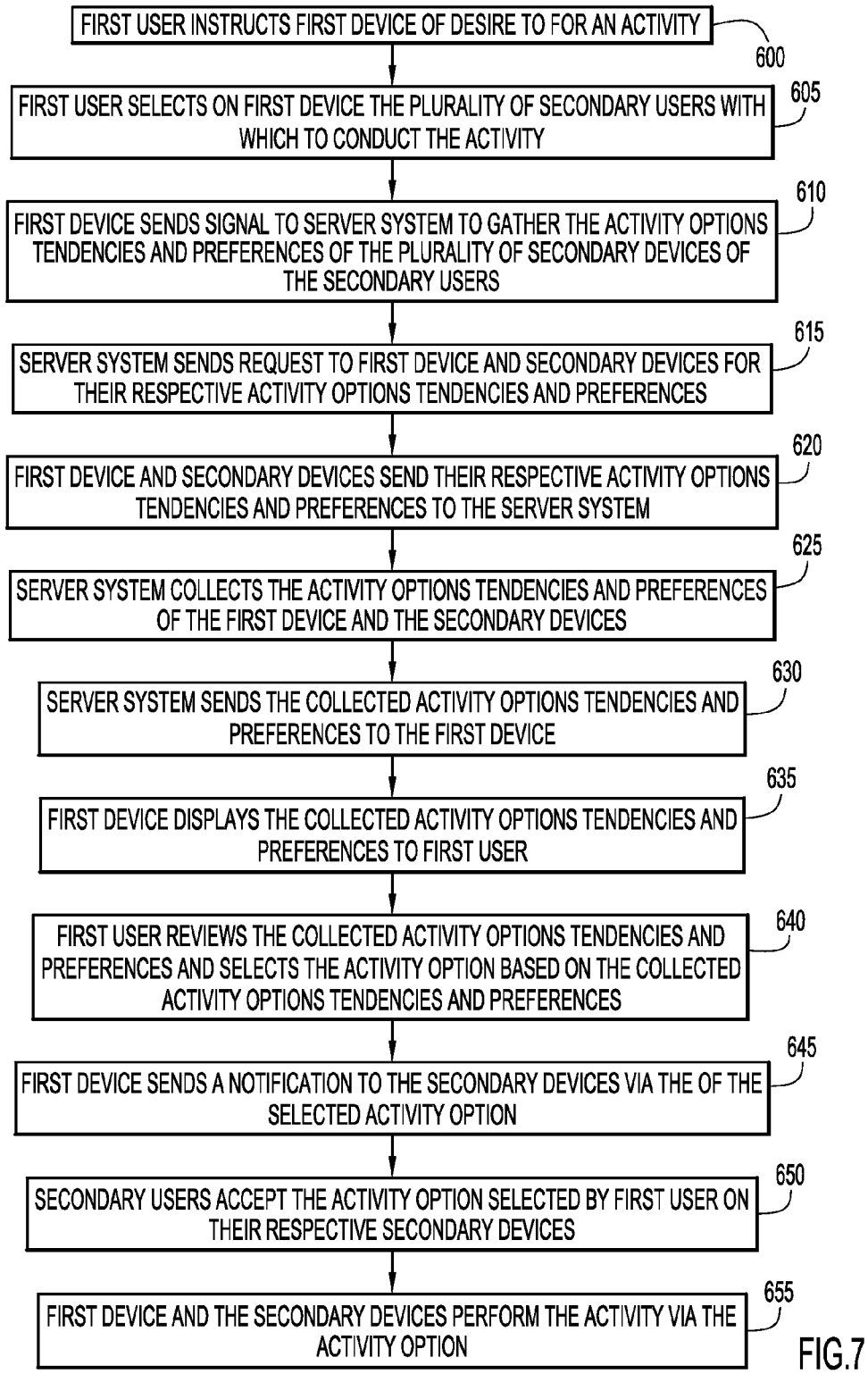
FIG. 7 is a procedural flow chart illustrating an example of the steps for determining an option from a compiled list of tendencies/behaviors/preferences from each participant for the options of an activity according to an embodiment of the present invention.

Turning to FIG. 7, illustrated is a flow chart of the steps performed for establishing the best option for an activity for the plurality of selected users, and then completing or performing the activity via the selected activity option between the plurality of users. For example, when a user wishes to establish a communication link between multiple users and has a variety of different communication channels to choose between, this embodiment of the present invention may aid the user in selecting the communication channel best suited for establishing a communication link between all of the participants. Moreover, the flow chart illustrated in FIG. 7 may be performed by the multiple devices (e.g., server system 100 and client systems 140, 140') illustrated in FIG. 1. At block 600, a first user instructs the first device (e.g., client system 140) that the user wishes to perform an activity. The activity could be any type of activity to be performed by two or more participants, such as establishing a communication link, going out to dinner, going to a movie, etc. At block 605, the first user selects on the first device one or more of the secondary users with which the first user wishes to perform the activity. At block 610, the first device sends a signal to the server system (e.g., server system 100) of the desire to perform the activity and to gather the activity options tendencies and preferences from the first device of the first user and secondary devices (e.g., client system 140') of the secondary users. The activity options tendencies and preferences may be the frequency that a user selects a certain option for the desired activity, the user's preferences for each available option for the desired activity, the rankings the user has given the options of the desired activity, etc. At block 615, the server system sends requests to the first device and the secondary devices for their respective activity options tendencies and preferences for the desired activity. At block 620, the first device and the secondary devices send their respective activity options tendencies and preferences to the server system. In some embodiments, the devices may receive and send their respective activity options tendencies and preferences without interaction or permission from the users. In other embodiments, the devices may receive a notification that the server system is requesting the activity options tendencies and preferences for that respective device. In this embodiment, the users may be required to accept or deny the request for the activity options tendencies and preferences to be sent to the server system.

At block 625, the server system collects the activity options tendencies and preferences from the first device and the secondary devices and determines tendency/preference values. For example, sum, weight, normalized measurements/ratings, etc. At block 630, the server system then sends the activity options tendencies and preferences to the first device. The next step, at block 635, is that the first device displays the activity options tendencies and preferences to the first user. The first device may display the activity options tendencies and preferences using one of the GUI's 200, 300, 400 illustrated in FIGS. 3A, 3B, 4A, 4B, 4C, 5A, 5B, 6A, 6B, 6C, and 6D. At block 640, the first user reviews the activity options tendencies and preferences and selects the best activity option based on the collected activity options tendencies and preferences. The first user may choose the activity option by selecting the activity option in the manners discussed with respect to the GUI's 200, 300, 400 illustrated in FIGS. 3A, 3B, 4A, 4B, 4C, 5A, SB, 6A, 6B, 6C, and 6D. Moreover, the first user may interact with GUI's 200, 300, 400 and apply one of the various guidelines for displaying the best activity option from the collected activity options tendencies and preferences.

At block 645, the first device may send a notification to the secondary devices regarding the selected activity option. For example, when the activity to be performed is establishing a communication link between a plurality of participants, the first device may send a notification via a communication channel that the communication channel being used to send the notification has been chosen for establishing the communication link between all of the participants. At block 650, on their respective secondary devices, the secondary users may accept or reject the activity option selected by the first user. Finally, at block 655, the first device and the secondary devices perform the activity via the selected activity option.

Figure 8:
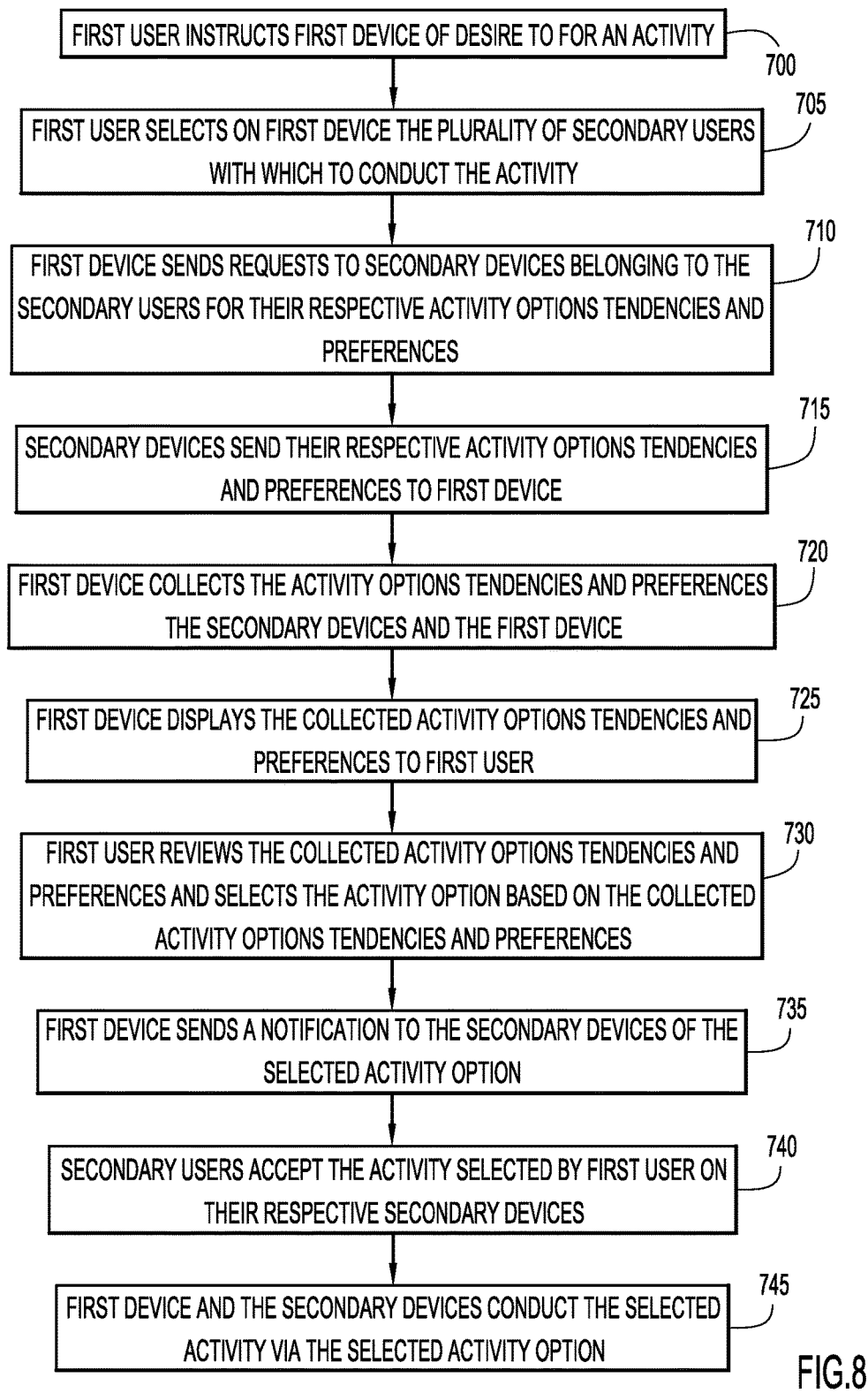
FIG. 8 is a procedural flow chart illustrating a second example of the steps for determining an option from a compiled list of tendencies/behaviors/preferences from each participant for the options of an activity according to an embodiment of the present invention.

FIG. 8 is a flow chart of an alternative manner for establishing a best option for an activity. The flow chart of FIG. 8 may be performed by the multiple devices illustrated in FIG. 2. At block 700, the first user instructs the first device that the user wishes to perform an activity. As previously explained, the activity could be any type of activity to be performed by two or more participants. At block 705, the first user selects on the first device (e.g., client system 140) the plurality of secondary users with which the first user wishes to perform the activity. At block 710, the first device sends a request to the secondary devices (e.g., client systems 140', 140", 140'"), which belong to the secondary users, for their respective activity options tendencies and preferences. As explained previously, the activity options tendencies and preferences may be the frequency that a user selects a certain option for the desired activity, the user's preferences for each available option for the desired activity, or the rankings the user has given the options of the desired activity. At block 715, the secondary devices send their respective activity options tendencies and preferences to the first device. The secondary devices may send their activity options tendencies and preferences with or without interaction or permission from their respective users, and with or without receiving a notification of the request for the activity options tendencies and preferences.

At block 720, the first device collects the activity options tendencies and preferences from the secondary devices and the first device and determines the tendency/preference value as described above. At block 725, the first device displays the collected activity options tendencies and preferences to the first user. The first device may display the activity options tendencies and preferences using one of the GUI's 200, 300, 400 illustrated in FIGS. 3A, 3B, 4A, 4B, 4C, 5A, 5B, 6A, 6B, 6C, and 6D. At block 730, the first user reviews the collected activity options tendencies and preferences and selects the best activity option based on the collected activity options tendencies and preferences. The first user may choose the activity option by selecting the activity option in the manners discussed with respect to the GUI's 200, 300, 400 illustrated in FIGS. 3A, 3B, 4A, 4B, 4C, 5A, 5B, 6A, 6B, 6C, and 6D. Moreover, the first user may interact with GUI's 200, 300, 400 and apply one of the various guidelines (greatest consensus, most preferred, least disliked, etc.) for displaying the best activity option from the collected activity options tendencies and preferences.

At block 735, the first device may send a notification to the secondary devices regarding the selected activity option. At block 740, on their respective secondary devices, the secondary users accept or reject the activity option selected by the first user. Finally, at block 745, the first device and the secondary devices perform the activity via the selected activity option.

In yet another embodiment, once a communication link has been established between a plurality of users via a first communication channel, the communication channel may be switched by one of the users further interacting with one of the GUI's 200, 300, 400 illustrated in FIGS. 3A-6D. Any user may interact with one of the GUI's 200, 300, 400 to specify an alternative channel that may initiate the process of ending the established communication link via a first communication channel and establishing a subsequent communication link via a second alternative communication channel. Once a second alternative communication channel has been selected by a user, the other users from the previously established communication link may be notified of the pending change of communication channels. The initially established communication link may then be ended, and then the new communication link via the second alternative communication channel may be established. The process of selecting a second alternative communication channel may be accomplished in the manner described for selecting a communication channel for each of GUI's 200, 300, 400.

It will be appreciated that the embodiments described above and illustrated in the drawings represent only a few of the many ways of implementing embodiments for establishing a communication link between participants based on the preferences, limitations, behaviors, and capabilities of each of the participants.

The embodiments described above and illustrated in the drawings streamline how two or more devices communicate with one another. The embodiments described above may continuously monitor the preferences, limitations, behaviors, and capabilities of each of the participants and may automatically establish a communication link between the participants when the desire for a communication link is indicated. The system may calculate the best communication channel for establishing a communication link based on the preferences, limitations, behaviors, and capabilities of each of the participants, and then may establish a communication link via the calculated best communication channel. The embodiments described above eliminate the need for decision making process by the computer system or the participants when determining which communication channel should be selected for establishing a communication link. This may all be done with only one of the participants indicating a desire for a communication link.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, activity collection module, activity tendency module, display module, etc.). These systems may include any types of monitors and input devices (e.g., keyboard, mouse, voice recognition, etc.) to enter and/or view information.

It is to be understood that the software (e.g., activity tendency module, display module, activity collection module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., activity tendency module, display module, activity collection module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user profiles, activity option tendencies, frequency of selection of activity options, rankings of activity options, preference of users for activity options, etc.). The database system may be implemented by any number of any conventional or other databases, data stores or storage structures (e.g., files, databases, data structures, data or other repositories, etc.) to store information (e.g., user profiles, activity option tendencies, frequency of selection of activity options, rankings of activity options, preference of users for activity options, etc.). The database system may be included within or coupled to the server and/or client systems. The database systems and/or storage structures may be remote from or local to the computer or other processing systems, and may store any desired data (e.g., user profiles, activity option tendencies, frequency of selection of activity options, rankings of activity options, preference of users for activity options, etc.).

The present invention embodiments may employ any number of any type of user interface (e.g., Graphical User Interface (GUI), command-line, prompt, etc.) for obtaining or providing information (e.g., activity option tendencies, frequency of selection of activity options, rankings of activity options, preference of users for activity options, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, profile scores, activity option tendencies, frequency of selection of activity options, rankings of activity options, preference of users for activity options, etc.).

The present invention embodiments are not limited to the specific tasks or algorithms described above, but may be utilized for determining an option for any activity between the participants by analyzing the preferences, limitations, and capabilities of each of the participants.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of conducting an activity among a plurality of participants comprising:
monitoring, by a processor, for each participant using a computing device to communicate among the plurality of participants, use of a plurality of options to conduct the activity, wherein the activity includes conducting a communication session between the plurality of participants and the plurality of options includes different communication channels to conduct the communication session, and wherein the monitored use includes for each participant a numerical ranking of the different communication channels based on at least one or more options used by that participant, one or more options most frequently used, the option preferred with respect to an initiator of the activity, the option preferred with respect to that participant, the options used with respect to one or more contexts and familiarity to that participant;
collecting, by the processor, the monitored use of each participant from the computing device of each participant and storing the collected monitored use in a repository;
processing, by the processor, the collected monitored use from the repository and generating a graphical display of the monitored use of each participant for each of the options for conducting the activity, wherein the graphical display includes a chart for each of at least two participants with a plurality of bars each indicating the use for a corresponding option and is presented on the computing devices of at least two participants;
combining, by the processor, the monitored use of each participant for each of the options, wherein the combining includes manipulating the charts of the at least two participants toward each other;
determining, by the processor, the option to employ for the activity based on the combined monitored uses, wherein the option for the activity was identified at least in part based on contact between the corresponding bars of an option; and
conducting, by the processor, the activity employing the determined option by establishing the communication session between the plurality of participants over the communication channel associated with the determined option in response to contact between the corresponding bars of the identified option.

2. The method of claim 1, wherein the graphical display further presents one or more from a group of common tendencies for options between the participants, and options currently active for the activity.

3. The method of claim 1, further comprising:
switching from the determined option to another option to conduct the activity in response to selection of the other option by one or more of the participants.

4. A system for conducting an activity among a plurality of participants comprising:
a plurality of computing devices; and
at least one processor configured to:
monitor for each participant using a computing device to communicate among the plurality of participants, use of a plurality of options to conduct the activity, wherein the activity includes conducting a communication session between the plurality of participants and the plurality of options includes different communication channels to conduct the communication session, and wherein the monitored use includes for each participant a numerical ranking of the different communication channels based on at least one or more options used by that participant, one or more options most frequently used, the option preferred with respect to an initiator of the activity, the option preferred with respect to that participant, the options used with respect to one or more contexts and familiarity to that participant;
collect the monitored use of each participant from the computing device of each participant and store the collected monitored use in a repository;
process the collected monitored use from the repository and generate a graphical display of the monitored use of each participant for each of the options for conducting the activity, wherein the graphical display includes a chart for each of at least two participants with a plurality of bars each indicating the use for a corresponding option and is presented on the computing devices of at least two participants;

combine the monitored use of each participant for each of the options, wherein the combining includes manipulating the charts of the at least two participants toward each other;

determine the option to employ for the activity based on the combined monitored uses, wherein the option for the activity was identified at least in part based on contact between the corresponding bars of an option; and conduct the activity employing the determined option by establishing the communication session between the plurality of participants over the communication channel associated with the determined option in response to contact between the corresponding bars of the identified option.

5. The system of claim 4, wherein the graphical display further presents one or more from a group of common tendencies for options between the participants, and options currently active for the activity.

6. The system of claim 4, wherein at least one processor is further configured to:

switch from the determined option to another option to conduct the activity in response to selection of the other option by one or more of the participants.

7. A computer program product for conducting an activity among a plurality of participants comprising:

a computer readable storage medium having computer readable program code embodied therewith, the computer readable program code comprising computer readable program code configured to:

monitor for each participant using a computing device to communicate among the plurality of participants, use of a plurality of options to conduct the activity, wherein the activity includes conducting a communication session between the plurality of participants and the plurality of options includes different communication channels to conduct the communication session, and wherein the monitored use includes for each participant a numerical ranking of the different communication channels based on at least one or more options used by that participant, one or more options most frequently used, the option preferred with respect to an initiator of the activity, the option preferred with respect to that participant, the options used with respect to one or more contexts and familiarity to that participant;

collect the monitored use of each participant from the computing device of each participant and store the collected monitored use in a repository;

process the collected monitored use from the repository and generate a graphical display of the monitored use of each participant for each of the options for conducting the activity, wherein the graphical display includes a chart for each of at least two participants with a plurality of bars each indicating the use for a corresponding option and is presented on the computing devices of at least two participants;

combine the monitored use of each participant for each of the options, wherein the combining includes manipulating the charts of the at least two participants toward each other;

determine the option to employ for the activity based on the combined monitored uses, wherein the option for the activity was identified at least in part based on contact between the corresponding bars of an option; and conduct the activity employing the determined option by establishing the communication session between the plurality of participants over the communication channel associated with the determined option in response to contact between the corresponding bars of the identified option.

8. The computer program product of claim 7, wherein the graphical display further presents one or more from a group of common tendencies for options between the participants, and options currently active for the activity.

9. The computer program product of claim 7, wherein the computer readable program code further comprises computer readable program code configured to:

switch from the determined option to another option to conduct the activity in response to selection of the other option by one or more of the participants.

* * * * *